United States Patent

Nakamura

[11] Patent Number: 5,541,815
[45] Date of Patent: Jul. 30, 1996

[54] AIMING MECHANISM FOR AUTOMOTIVE LAMP

[75] Inventor: Yasuhiro Nakamura, Shizuoka, Japan

[73] Assignee: Koito Manufacturing Co., Ltd., Tokyo, Japan

[21] Appl. No.: 442,765

[22] Filed: May 17, 1995

[30] Foreign Application Priority Data

May 19, 1994 [JP] Japan .................................. 6-105648

[51] Int. Cl.$^6$ ............................................. B60Q 1/068
[52] U.S. Cl. ........................... 362/66; 362/273; 362/419
[58] Field of Search ................................ 362/61, 66, 273,
362/271, 275, 418, 419

[56] References Cited

U.S. PATENT DOCUMENTS

| | | | |
|---|---|---|---|
| 4,574,334 | 3/1986 | Igura | 362/66 |
| 4,621,307 | 11/1986 | Weber | 362/66 |
| 4,839,785 | 6/1989 | Ohishi | 362/61 |
| 4,884,174 | 11/1989 | Dorleans | 362/61 |
| 5,113,330 | 5/1992 | Makita | 362/61 |
| 5,130,900 | 7/1992 | Makita | 362/61 |
| 5,386,349 | 1/1995 | Wheat et al. | 362/61 |

*Primary Examiner*—Leonard E. Heyman
*Attorney, Agent, or Firm*—Sughrue, Mion, Zinn, Macpeak & Seas

[57] ABSTRACT

An aiming mechanism for a automotive lamp in which play is prevented from developing between a nut, threadedly engaged with an aiming screw, and a nut insertion hole formed in a lamp housing. The aiming screw is connected at its front end to a connecting portion of a lamp unit in a manner so as to allow relative pivotal movement therebetween. The aiming screw is threadedly engaged with a nut made of a synthetic resin mounted in a nut insertion hole in a lamp housing also made of a synthetic resin, and extends through the lamp housing in a direction generally parallel to an axis of the lamp housing. When the aiming screw is turned, the aiming screw is moved back and forth relative to the lamp housing to tilt the lamp unit. The nut is fixedly secured to the lamp housing by mounting screws, and a peripheral sleeve extends from the surface of the lamp housing which defines the peripheral edge portion of the nut insertion hole, and faces away from that surface of the lamp housing to which the mounting screws are fixedly secured, the peripheral sleeve embracing the nut. The peripheral sleeve increases the area of support of the nut by the nut insertion hole in the direction in which the aiming screw extends, so that the amount of shaking of the nut and the aiming screw in the nut insertion hole is reduced.

7 Claims, 4 Drawing Sheets

AIMING MECHANISM FOR AUTOMOTIVE LAMP

BACKGROUND OF THE INVENTION

The present invention relates to an aiming mechanism for a automotive lamp in which a lamp unit can be tilted relative to a lamp housing by turning aiming screws. More particularly, the invention relates to the structure of a nut which is fixedly mounted in a nut insertion hole in the lamp housing to support the aiming screw, as well as to the construction in the vicinity of the nut insertion hole supporting the nut.

FIGS. 6 and 7 show an aiming mechanism for a headlamp of an automobile (such as that disclosed in Japanese Utility Model Unexamined Publication No. 5-23093). A headlamp unit 1 is tiltably supported on a lamp housing 5 by an aiming mechanism composed of two aiming screws 2 and 3, and one ball joint 4. The aiming screws 2 and 3 are threadedly engaged with respective nuts 6, and extend through the lamp housing 5 in a direction generally parallel to the axis of the lamp housing. Each nut 6 is fixedly mounted in a nut insertion hole 5a formed in the lamp housing 5. A ball portion 2a (3a) formed at the front end of the aiming screw 2 (3) is supported by a socket 2b (3b) formed on the lamp unit 1 in a manner so as to allow a pivotal movement therebetween. A ball portion 4a, serving as one member of a ball joint, is supported by a socket 4b, serving as the other member of the ball joint.

When the aiming screw 2 (3) is turned, the aiming screw 2 (3) is moved back and forth relative to the nut 6, so that the socket 2b (3b) moves back and forth together with the aiming screw 2 (3). Namely, the lamp unit 1 is tilted about a horizontal tilt axis Lx and a vertical tilt axis Ly, thereby adjusting the tilt angle of the optical axis L of the headlamp unit 1.

The headlamp unit 1 is supported in a cantilevered fashion by the two aiming screws 2 and 3 extending forwardly from the lamp housing 5 and by the ball joint 4 provided between the lamp housing 5 and the lamp unit 1. With this construction, the weight of the headlamp unit 1 acts on the front end of the aiming screw 2 (3), and thus on the nut insertion hole 5a in which the nut 6, threadedly engaged with the aiming screw 2 (3) is mounted. As a result, the metal aiming screw 2 (3) tends to vibrate or shake relative to the nut insertion hole 5a due to inertial forces acting on the headlamp unit 1 during the operation of the automobile. Also, the nut 6, threadedly engaged with the aiming screw 2 (3), tends to shake relative to the nut insertion hole 5a. In addition, when the aiming screw 2 (3) is turned, it slightly shakes. Therefore, in order to eliminate resulting wear between the nut 6 and the nut insertion hole 5a, as well as between the aiming screw 2 (3) and the nut 6, it is desirable that the aiming screw 2 (3) be supported at a support portion to allow for slight movement so as to prevent stress from developing at the support portion.

For this reason, the nut is made of a synthetic resin more resilient than metal. Generally, however, the lamp housing 5 is also made of a synthetic resin (primarily for the purpose of reducing the weight of the headlamp), and moreover the nut 6 is fixed relative to the nut insertion hole 5a merely by fitting the former into the latter. Therefore, the peripheral edge of the aiming screw-fitting hole of the nut 6 tends to be worn by the shaking motion of the aiming screw 2 (3). Also, the nut 6 can shake in the nut insertion hole 5a causing wear, so that play or backlash develops between the nut 6 and the nut insertion hole 5a. This results in problems that the proper aiming adjustment cannot be achieved and that the supporting of the headlamp unit 1 becomes unstable.

SUMMARY OF THE INVENTION

With the above problems of the prior art in view, it is an object of this invention to provide an aiming mechanism for a automotive lamp in which play cannot develop between a nut, threadedly engaged with an aiming screw, and a nut insertion hole formed in a lamp housing.

The above and other objects of the invention have been achieved by an aiming mechanism for a automotive lamp wherein an aiming screw is connected at its front end to a connecting portion of a lamp unit in a manner so as to allow relative pivotal movement therebetween, the aiming screw is threadedly engaged with a nut made of a synthetic resin mounted in a nut insertion hole in a lamp housing also made of a synthetic resin and extends through the lamp housing in a direction generally parallel to an axis of the lamp housing such that, when the aiming screw is turned, the aiming screw is moved back and forth relative to the lamp housing to tilt the lamp unit, wherein the nut is fixedly secured to the lamp housing by mounting screws, and a peripheral sleeve extends from the surface of the lamp housing which defines a peripheral edge portion of the nut insertion hole and faces away from the surface of the lamp housing to which the mounting screws are fixedly secured, the peripheral sleeve embracing the nut.

The nut threadedly engaged with the aiming screw, as well as the lamp housing having the nut insertion hole, is made of a synthetic resin. However, since the nut is fixedly secured to the lamp housing by the mounting screws, play or backlash is prevented from developing between the nut and the nut insertion hole. Moreover, the peripheral sleeve, extending along the peripheral edge portion of the nut insertion hole, embraces the portion of the nut projecting from the nut insertion hole, thereby preventing the nut and the aiming screw from shaking relative to the nut insertion hole. Namely, the area of support of the nut by the nut insertion hole is increased by the provision of the peripheral sleeve, so that shaking of the aiming screw, as well as shaking of the nut in the nut insertion hole, is suppressed.

DESCRIPTION OF THE PREFERRED EMBODIMENTS

Preferred embodiments of the present invention will now be described with reference to the drawings.

Figure 1:
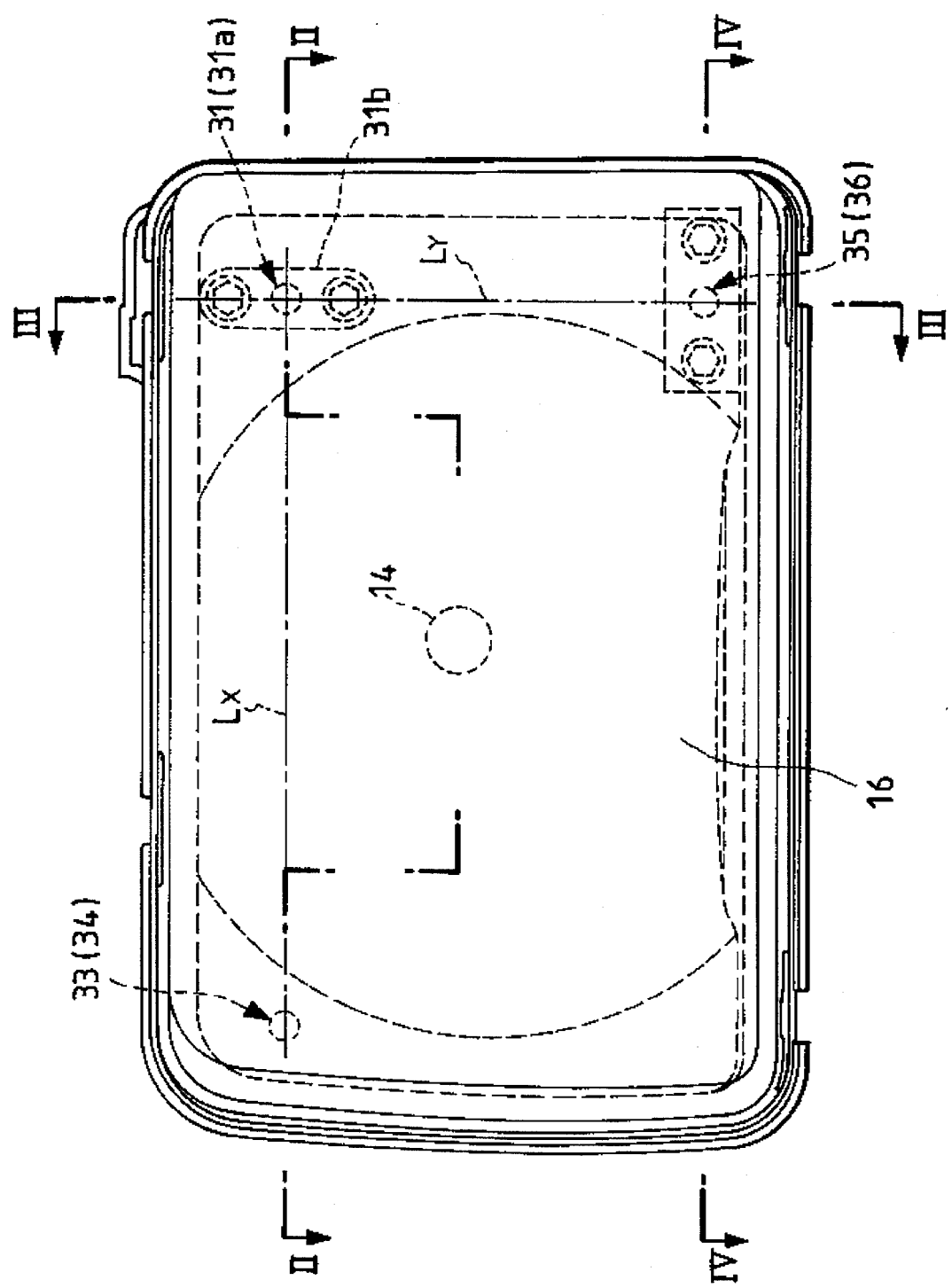
FIG. 1 is a front-elevational view of an automotive headlamp to which the present invention is applied.
Figure 2:
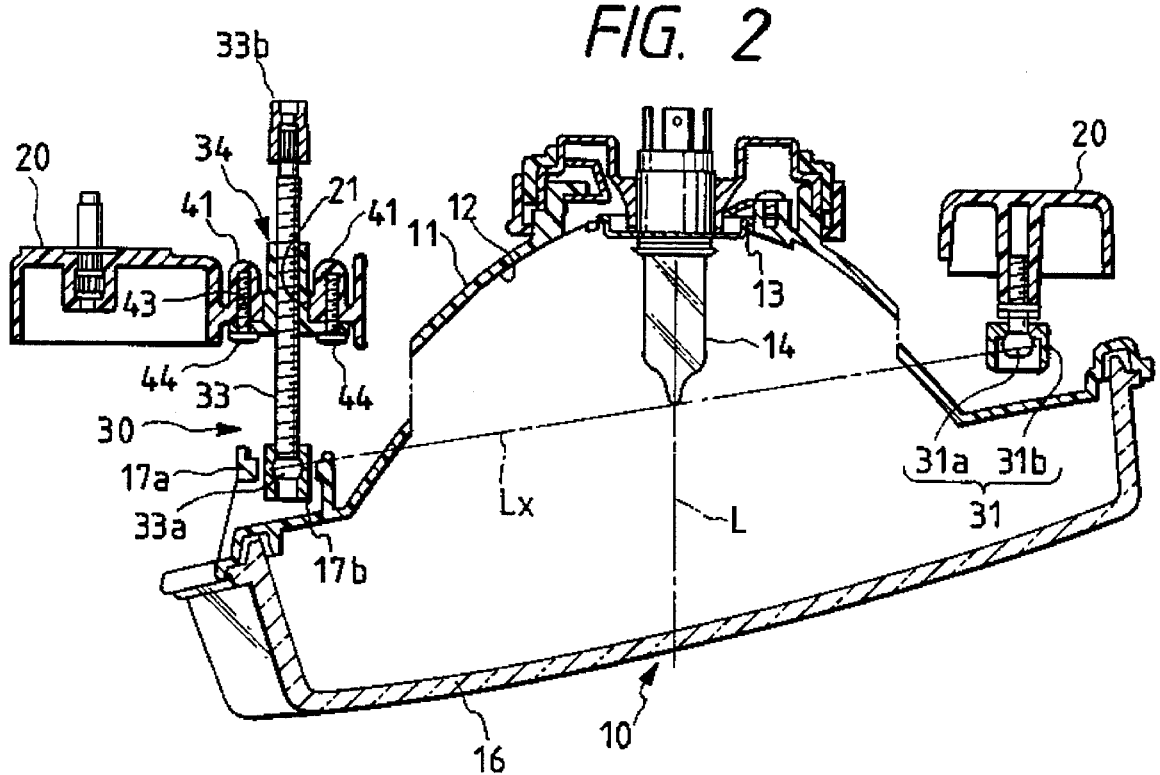
FIG. 2 is a horizontal cross-sectional view of the headlamp taken along the line II—II in FIG. 1.
Figure 3:
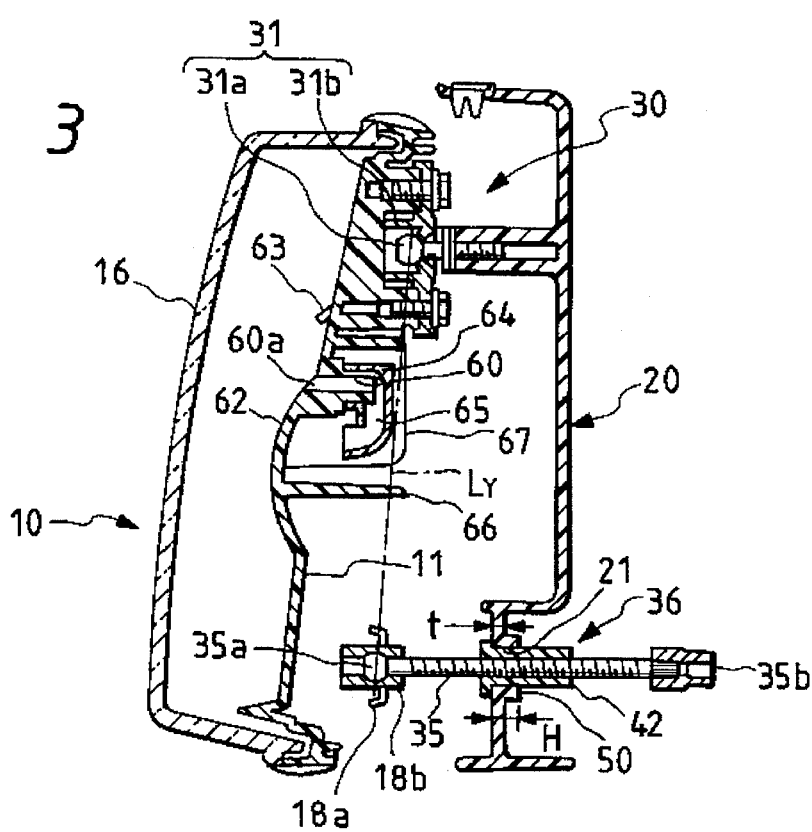
FIG. 3 is a vertical cross-sectional view of the headlamp taken along the line III—III in FIG. 1.
Figure 4:
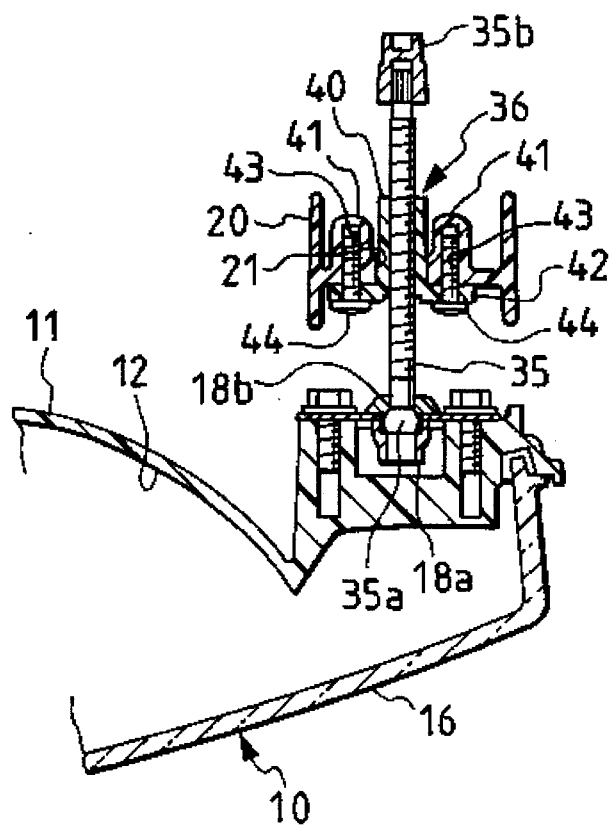
FIG. 4 is a horizontal cross-sectional view showing a nut insertion hole and neighboring portions.
Figure 5:
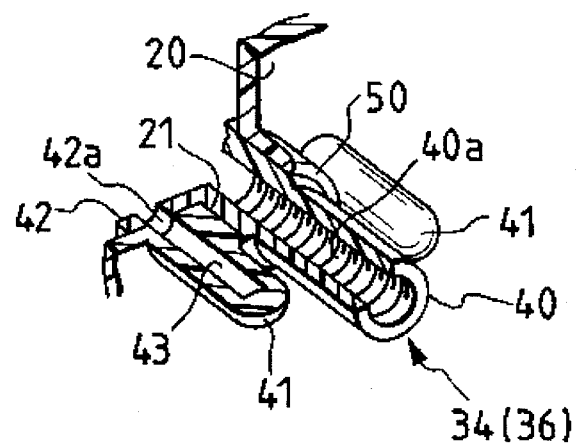
FIG. 5 a partly broken away, perspective view of an important portion of the headlamp on an enlarged scale;.
Figure 6:
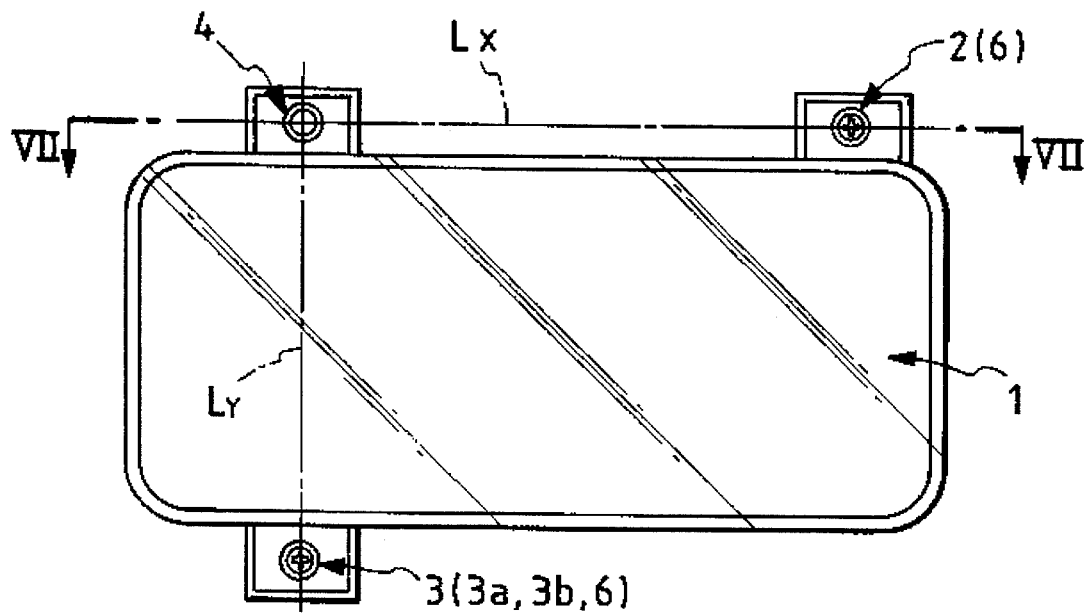
FIG. 6 is a front elevational view of a conventional automotive headlamp.
Figure 7:
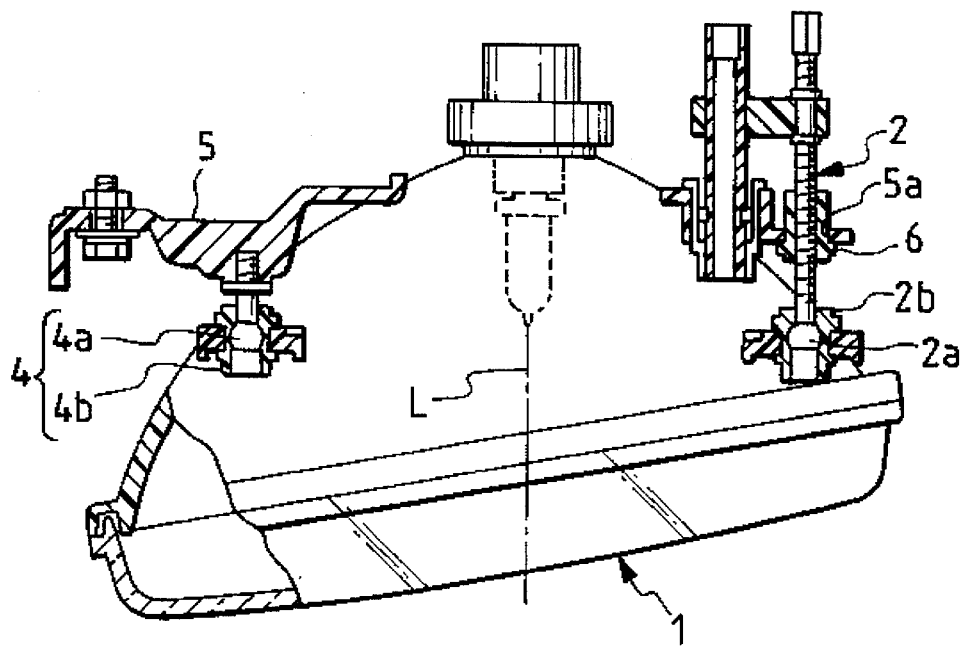
FIG. 7 is a horizontal cross-sectional view of the conventional headlamp taken along the line VII—VII in FIG. 6.

FIGS. 1 to 5 show a headlamp for an automobile in which a headlamp unit is supported by an aiming mechanism for tilting movement relative to a lamp housing. More specifically, FIG. 1 is a front elevational view of the headlamp, FIG. 2 is a horizontal cross-sectional view of the headlamp taken along the line II—II in FIG. 1, FIG. 3 is a vertical cross-sectional view of the headlamp taken along the line III—III in FIG. 1, FIG. 4 is a horizontal cross-sectional view showing a nut insertion hole and neighboring portions, and FIG. 5 a partly broken away, perspective view of an important portion of the headlamp shown on an enlarged scale.

In these figures, a generally cup-shaped lamp body 11 made of a synthetic resin has a parabolic reflector 12 formed integrally on an inner side thereof. A bulb 14 is mounted in a bulb mounting hole 13 formed in a central portion of the lamp body 11. A front lens 16 is mounted over the open front end of the lamp body 11. These parts are joined together to form a headlamp unit (hereinafter referred to as "lamp unit").

The lamp housing 20, which is made of a relatively hard synthetic resin such as polypropylene, is provided at the rear side of the lamp unit 10. The aiming mechanism 30 is provided between the lamp unit 10 and the lamp housing 20 so as to allow the lamp unit 10 to tilt relative to the lamp housing 20 in an adjustable manner.

The lamp unit 10 is tiltably supported at the front side of the lamp housing 20 by the aiming mechanism 30, which is composed of one ball joint 31, a right-left direction aiming screw 33, and an upward-downward direction aiming screw 35. A ball portion 31a of the ball joint 31 is fixed to the lamp housing 20, and a socket 31b engaged with the ball portion 31a is fixedly secured to the rear side of the lamp unit 10 (see FIG. 3). The lamp unit 10 is pivotally movable about the ball joint 31. The aiming screws 33 and 35 are threadedly passed through and supported by respective screw support nuts 34 and 36 which are made of a relatively soft synthetic resin (e.g., nylon) and which are fixedly fitted in nut insertion holes 21 in the lamp housing 10. Ball portions 33a and 35a, formed at front ends of respective ones of the aiming screws 33 and 35, are rotatably supported by sockets 17b and 18b, respectively, fixedly fitted in corresponding brackets 17a and 18a mounted at the rear side of the lamp unit 10. Tool engagement portions 33b and 35b (with which a screwdriver or the like is engageable) are formed at the rear ends of the aiming screws 33 and 35 so that each of the aiming screws 33 and 35 can be manipulated or turned from the rear side of the lamp housing 20.

When the aiming screw 33 (35) is turned, it is moved back and forth relative to the nut 34 (36), so that the unit-side socket 17b (18b), engaged with the front ball portion 33a (35a) of the screw, moves back and forth together with the screw 33 (35), thereby changing the angle of inclination of the amp unit 10 and hence the direction of the lamp beam.

More specifically, the point of support of the lamp unit 10 by the right-left direction aiming screw 33 (that is, the portion where the ball portion 33a of the aiming screw is engaged with the unit-side socket 17b) lies on a horizontal axis Lx which is generally perpendicular to the illumination axis L of the headlamp (see FIG. 2), passing through the ball joint 31. The point of support of the lamp unit 10 by the upward-downward direction aiming screw 35, that is, the portion where the ball portion 35a of the aiming screw is engaged with the unit-side socket 18b, lies on a vertical axis Ly which is generally perpendicular to the illumination axis L of the headlamp, and passes through the ball joint 31.

With this construction, when the aiming screw 33 is turned, the aiming screw is moved back and forth relative to the lamp housing 20, so that the lamp unit 10 is tilted about the vertical axis Ly. As a result, the angle of inclination of the lamp unit 10 relative to the lamp housing 20 in the right-left direction (that is, the illumination angle of the headlamp in the right-left direction) is changed. On the other hand, when the aiming screw 35 is turned and thus moved back and forth relative to the lamp housing 20, the lamp unit 10 is tilted about the horizontal axis Lx. As a result, the inclination of the lamp unit 10 relative to the lamp housing 20 in the upward-downward direction, that is, the illumination angle of the headlamp in the upward-downward direction, is changed. Thus, the inclination of the lamp unit 10, and hence the illumination angle of the headlamp, can be adjusted by the two aiming screws 33 and 35.

The screw support nut 34 (36) has a cylindrical portion 40 having an internally threaded hole 40a (see FIG. 5) with which an externally threaded portion of the respective aiming screw 33, 35 is threadedly engaged. A flange 42, having screw insertion holes 42a, is formed integrally with one end of the cylindrical portion 40. The cylindrical portion 40 is fitted into the nut insertion hole 21 formed in the lamp housing 20, and the flange portion 42 is fixedly secured to the lamp housing 20 by mounting screws 44, so that the nut 34, 36 is fixedly mounted in the nut insertion hole 21 at the rear side of the lamp housing 20. A pair of bosses 41 are formed on the lamp housing 20 disposed on respective opposite sides of the nut insertion hole 21, and a screw hole 43 is formed in each boss 41.

A cylindrical peripheral sleeve 50 extends from the peripheral edge portion of the nut insertion hole 21 through the latter, embracing the nuts 34 (36), and thereby preventing the nut 34 (36) from shaking in the nut insertion hole 21. The peripheral sleeve 50 has an inner peripheral surface conforming to the inner peripheral surface of the nut insertion hole 21.

Were it not for the nut support area provided by the peripheral sleeve 50, the nut support area would correspond only to that provided by the wall thickness t of the lamp housing 20. On the other hand, in the case of the provision of the sleeve 50 in accordance with the present invention, the nut support area corresponds to that obtained by the sum of the wall thickness t of the lamp housing 20 and the projection length H of the peripheral sleeve 50. Thus, the area of support of the nut 34 (36) by the nut insertion hole 21 (that is, the area of contact between the nut insertion hole and the nut) is increased, so that the nut 34 (36) is prevented from shaking in the nut insertion hole 21. The fact that the nut 34 (36) is largely prevented from shaking in the nut insertion hole 21 means that shaking of the aiming screw 33 (35) at the nut insertion hole 21 is suppressed, and therefore wear and deformation are less likely to develop at the peripheral edge portion of the internally threaded hole 40a of the nut 34 (36).

Moreover, since the nut 34 (36) is made of a relatively soft synthetic resin (e.g., nylon) as compared with the relatively hard synthetic resin (e.g., polypropylene) of which the lamp housing 20 is made, the nut insertion hole 21 is more likely to be deformed by the shaking of the aiming screw 33, 35 than the nut 34 (36). In other words, the nut insertion hole 21, which essentially cannot be replaced or repaired, is protected by deformation or wear of the nut 34 (36), which can be easily replaced.

An air vent hole 60 (see FIG. 3) is formed in the lamp body 11 of the headlamp unit 10, and that portion 62 of the front face of the lamp body 11 disposed immediately adjacent to and downward of the air vent hole 60 bulges forwardly into an arcuate configuration. One end 60a of the air vent hole 60 opening to the interior of the lamp unit 10 is slanted progressively downward toward the front lens 16. With this arrangement, water droplets dropping along the front face of the lamp body 11 can easily flow into the air vent hole 60 through the open end 60a, so that the water droplets within the lamp unit 10 can be more positively discharged to the exterior of the lamp unit 10. A U-shaped rubber tube 65 is attached to an air vent portion 64 of a cylindrical shape extending from the rear surface of the lamp unit 10, with the lower open end of the rubber tube 65 directed toward the rear surface of the lamp unit 10. A water-blocking wall 66 is formed on the rear surface of the lamp unit 10 below the lower open end of the rubber tube 65, and water-blocking walls 67 are formed on the rear surface of the lamp unit 10 at opposite sides of the rubber tube 65. These water-blocking walls 66 and 67 prevent water rising along the rear surface of the lamp unit 10 from intruding into the rubber tube 65 through the lower open end thereof.

As described above, in the aiming mechanism of the invention for an automotive lamp, a nut threadedly engaged with the aiming screw, as well as the lamp housing having the nut insertion hole, are made of a synthetic resin. However, since the nut is fixedly secured to the lamp housing by mounting screws, play or backlash is prevented from developing between the nut and the nut insertion hole. Moreover, since the aiming screw and the nut are embraced by the peripheral sleeve extending along the peripheral edge portion of the nut insertion hole, the amount of shaking of the aiming screw and the nut relative to the nut insertion hole is sufficiently small that the aiming screw can be turned properly, and also the headlamp is supported in a stable manner.

What is claimed is:

1. An aiming mechanism for a automotive lamp wherein an aiming screw is connected at its front end to a connecting portion of a lamp unit in a manner so as to allow relative pivotal movement therebetween, said aiming screw is threadedly engaged with a nut made of a synthetic resin mounted in a nut insertion hole in a lamp housing made of a synthetic resin, and extends through said lamp housing in a direction generally parallel to an axis of said lamp housing, and when said aiming screw is turned, said aiming screw is moved back and forth relative to said lamp housing to tilt said lamp unit, the improvement wherein said nut is fixedly secured to said lamp housing by mounting screws, and a peripheral sleeve extends from a surface of said lamp housing which defines a peripheral edge portion of said nut insertion hole, and faces away from a surface of said lamp housing to which said mounting screws are fixedly secured, said peripheral sleeve embracing said nut.

2. An automotive lamp comprising: a lamp unit comprising a light source and a reflector; a lamp housing having at least a portion thereof disposed rearward of said lamp unit; an aiming screw extending between said lamp unit and said lamp housing for adjusting a tilt angle of said lamp unit relative to said lamp housing; a nut fixed within a hole in said lamp housing, said aiming screw being threadedly engaged with said nut and passing through said hole in said lamp housing; at least one screw fixing said nut to said lamp housing; and a peripheral sleeve extending from a surface of said lamp housing at a peripheral edge portion of said hole and embracing said nut.

3. The automotive lamp of claim 2, wherein said peripheral sleeve has an inner peripheral surface conforming to an inner peripheral surface of said hole.

4. The automotive lamp of claim 2, wherein said nut and said lamp housing are made of a synthetic resin.

5. An automotive lamp comprising: a lamp unit comprising a light source and a reflector; a lamp housing having at least a portion thereof disposed rearward of said lamp unit; and an aiming mechanism for adjustably tiltably supporting said lamp unit on said lamp housing, said aiming mechanism comprising:

a ball joint having one of a ball and a socket member coupled to said lamp unit and the other of said ball and socket member coupled to said lamp housing;

a pair of aiming screws extending between said lamp unit and said lamp housing for adjusting a tilt angle of said lamp unit relative to said lamp housing in up-and-down and right-and-left directions;

a pair of nuts fixed within respective holes in said lamp housing, said aiming screws being threadedly engaged with respective ones of said nuts and passing through respective ones of said holes in said lamp housing;

a pair of screws fixing each of said nuts to said lamp housing; and a pair of peripheral sleeves extending from a surface of said lamp housing at respective peripheral edge portions of said hole and embracing respective ones of said nuts.

6. The automotive lamp of claim 5, wherein said peripheral sleeve has an inner peripheral surface conforming to an inner peripheral surface of said hole.

7. The automotive lamp of claim 5, wherein said nuts and said lamp housing are made of a synthetic resin.

* * * * *